United States Patent

Bradley

[11] 3,985,980
[45] Oct. 12, 1976

[54] TRIGGERED DISPLAY FOR TELEPHONE LINE CHARACTERISTIC MEASURING INSTRUMENT

[76] Inventor: Frank R. Bradley, 9 Dash Place, Bronx, N.Y. 10463

[22] Filed: Sept. 3, 1975

[21] Appl. No.: 609,987

[52] U.S. Cl. ..................... 179/175.3 R; 324/121 R
[51] Int. Cl.² .......................................... H04B 3/46
[58] Field of Search ................... 179/175.3 R, 175; 315/8.5, 3; 324/121 R

[56] References Cited
UNITED STATES PATENTS

| | | | |
|---|---|---|---|
| 3,115,605 | 12/1963 | Coulter | 324/121 R |
| 3,201,641 | 8/1965 | Thorne | 324/121 R |
| 3,551,733 | 12/1970 | Johnson | 324/121 R |
| 3,814,868 | 6/1974 | Bradley | 179/175.3 R |
| 3,836,735 | 9/1974 | Bradley | 179/175.3 R |
| 3,836,851 | 9/1974 | Schumann | 324/121 R |

Primary Examiner—Douglas W. Olms
Attorney, Agent, or Firm—Gottlieb, Rackman, Reisman & Kirsch

[57] ABSTRACT

There is disclosed an improved display, of the type described in my co-pending application Ser. No. 455,197 now Pat. No. 3,906,173 issued on Sept. 16, 1975, for use with a telephone line characteristic measuring instrument. A signal representing the instantaneous in-phase component of the total disturbance on a received test tone is applied to one set of deflection plates of a storage oscilloscope, and a signal representing the instantaneous quadrature component of the total disturbance on the received test tone is applied to the orthogonal deflection plates. The display is formed only in response to the detection of a disturbance. By detecting a disturbance and maintaining a display of it, the display can be studied at length.

20 Claims, 6 Drawing Figures

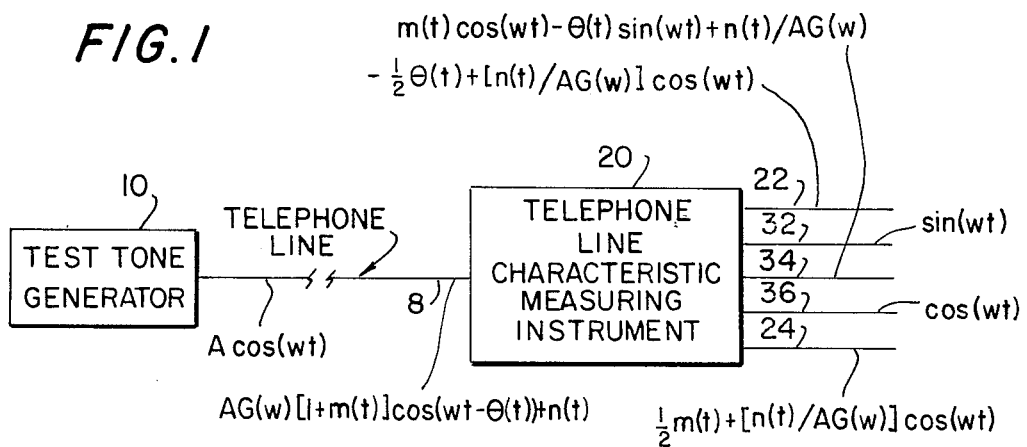
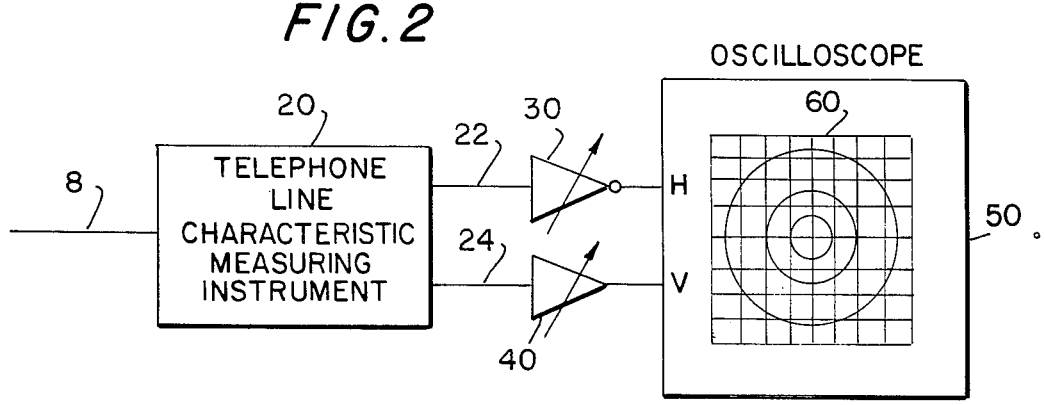
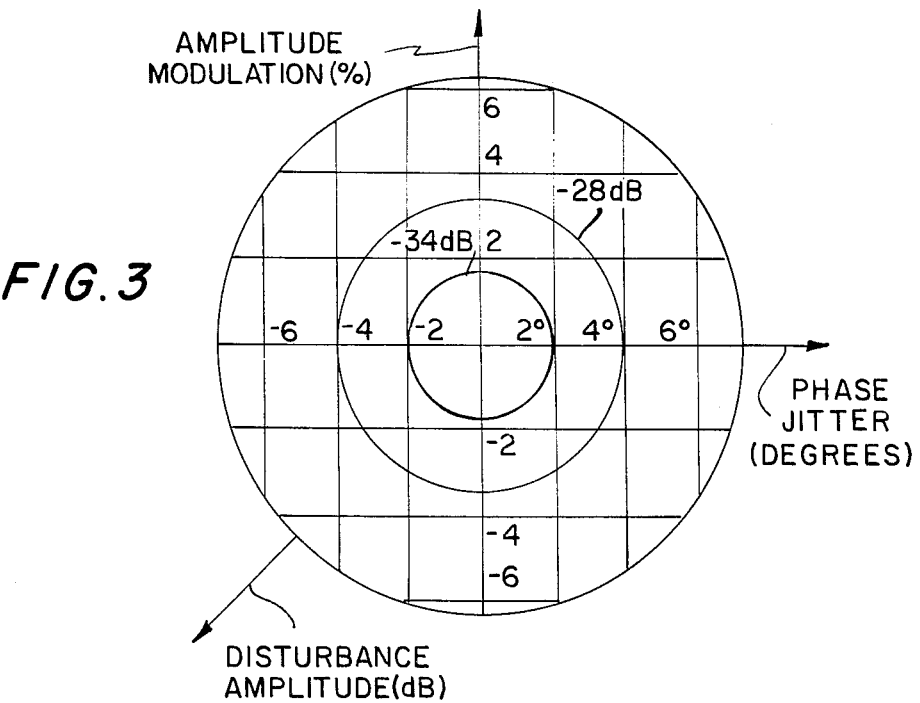

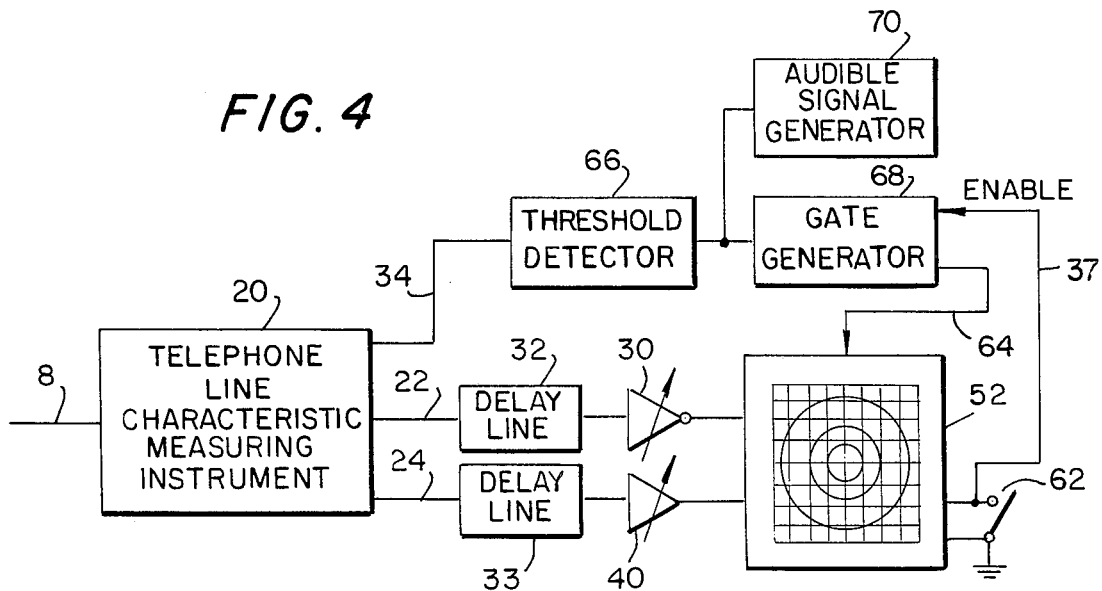
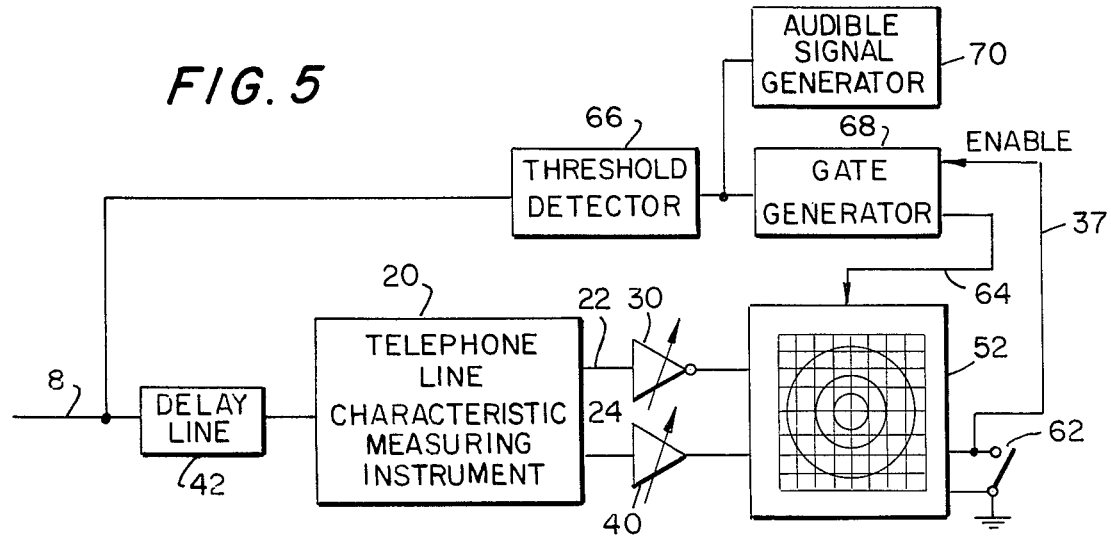
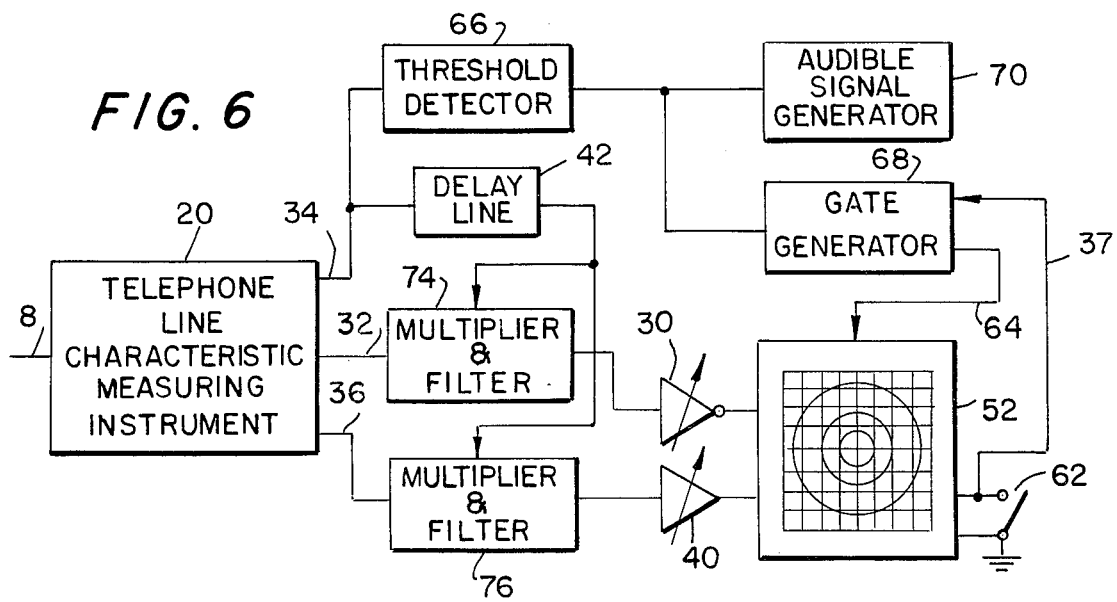

TRIGGERED DISPLAY FOR TELEPHONE LINE CHARACTERISTIC MEASURING INSTRUMENT

This invention relates to telephone line characteristic measuring instruments, and more particularly to displays for use therewith.

In my U.S. Pat. No. 3,814,868, issued on June 4, 1974 and entitled "Telephone Line Characteristic Measuring Instrument," which patent is hereby incorporated by reference, there is disclosed an improved apparatus for facilitating the identification of sources of data transmission errors. As described in detail therein, a test tone is transmitted and at the end of the transmission path the signal is normalized so that its test tone component is a reference value. The test tone is removed from the uncorrelated background noise and other disturbances, and the disturbances are operated upon directly. By first subtracting a replica of the test tone from the normalized received signal, only the periodic and noise components which are of diagnostic interest remain to be processed.

The test tone signal which is transmitted over the communication channel is a single-frequency signal of the form $A\cos(wt)$. The received signal V, in the absence of non-linear distortion products, can be expressed as follows:

$$V = AG(w)[1+m(t)]\cos(wt+\theta(t))+n(t).$$

In this equation, $G(w)$ is the channel amplitude characteristic at the frequency of the test tone and is a measure of the loss of the channel at the test frequency, $m(t)$ is the incidental amplitude modulation, $\theta(t)$ is the incidental phase modulation and includes AC components which cause the zero-crossings of a signal to "jitter" (often referred to as "phase jitter"), and $n(t)$ is the total uncorrelated interference (noise).

The received signal is normalized and the test tone is "notched out" from it. Thereafter, what is left of the signal is multiplied by $\cos(wt)$ and $\sin(wt)$ signals to generate instantaneous in-phase and quadrature components of the notched-noise signal (the received signal after the test tone is notched out). The notched-noise signal includes coherent components (amplitude and phase modulation, and amplitude and phase hits) as well as non-coherent components (background noise, single-frequency interference and impulse hits). It is the multiplication of the notched-noise signal by the sine and cosine functions that effectively isolates the amplitude modulation and phase modulation components. After the two signals are passed through respective 20–300 Hz filters, there results two signals in the following forms:

$$(\tfrac{1}{2})m(t)+[n(t)/AG(w)]\cos(wt)$$

and $$(-\tfrac{1}{2})\theta(t)+[n(t)/AG(w)]\sin(wt).$$

The first expression represents the instantaneous in-phase component of the total disturbance (in the 20–300 Hz band of interest) on the received test tone; the first term in the expression represents the amplitude modulation component, and the second term in the expression represents the instantaneous in-phase component of the normalized noise on the received test tone. Similarly, the second expression represents the instantaneous quadrature component of the total disturbance (in the 20–300 Hz band of interest) on the received test tone; the first term in the expression represents the instantaneous phase modulation component, and the second term represents the instantaneous quadrature component of the normalized noise on the received test tone.

Neither expression is an exact representation of the parameters of interest. This is due to the fact that certain simplifying assumptions were made in the derivation of the expressions. Nevertheless, the two expressions are substantially correct representations of the signal components described above; when measurements are taken of them, the measurements provide not only quantitative information concerning the distortion introduced by the transmission path, but substantially correct quantitative information as well.

In my co-pending application, Ser. No. 455,197, filed on Mar. 27, 1974 and entitled "Telephone Line Characteristic Measuring Instrument and Display", now U.S. Pat. No. 3,906,173 issued on Sept. 16, 1975, which application is hereby incorporated by reference, there is disclosed an apparatus which operates on the above-described signals to form an oscilloscope display which permits immediate identification of transmission problems. The two signals described above represent in-phase and quadrature components of the total disturbance on the received test tone (without the test tone itself). The two signals are applied to the orthogonal deflection controls of a cathode ray tube (oscilloscope). In the absence of any disturbance whatsoever, a spot appears on the oscilloscope. If the display is conceived to represent the trace formed by orthogonal "disturbance" vectors, in the absence of any disturbance all that is seen is the tip of the tone vector at the origin of the display. But if any disturbances are present, the spot position on the display represents the combined instantaneous disturbance of the tone in both phase and amplitude. If the display is suitably calibrated, not only are quantitative measurements of amplitude jitter, phase jitter and sideband energy immediately available, but the major sources of disturbances are immediately evident.

As in the case of most oscilloscope displays, the display which is produced is transient in nature, that is, the display is formed upon the occurrence of the disturbance and then fades away. It is by viewing the displays resulting from successive disturbances that the predominant form of disturbance can be determined. But one problem with this form of display, as in the case of most oscilloscope displays which represent single-shot events, is that the display fades away after a second or two and it may be difficult to take accurate measurements from the display. In some cases, it would be preferable to provide a more permanent display which could be viewed at length. This is especially true where the disturbances are infrequent and there is little need in the first place to insure that the display fades away rapidly before the next disturbance occurs.

Accordingly, it is an object of my present invention to provide a display of the type described which is formed in response to the detection of a disturbance and which may be viewed at length.

Briefly, in the illustrative embodiments of the present invention, the display is formed on a storage oscilloscope. Once a display is formed, it persists on the screen until an erase button is operated. The electron beam of the oscilloscope is ordinarily blanked (Z-axis control). Only when a disturbance is detected, as will be described below, is a new display formed. This display is maintained until after the erase button is once again operated. In this way, any display of interest may be maintained as long as desired by the operator.

Further objects, features and advantages of my invention will become apparent upon consideration of the following detailed description in conjunction with the drawing, in which:

FIG. 1 is a block-diagram representation of the manner in which test measurements are made in accordance with the principles of my above-identified U.S. Pat. No. 3,814,868 and shows various signals which are derived by the instrument 20;

FIG. 2 depicts the illustrative embodiment of the invention disclosed in my aforesaid application;

FIG. 3 depicts the graticule which is placed on the oscilloscope display of FIG. 2; and FIGS. 4–6 depict three illustrative embodiments of the present invention.

As shown in FIG. 1, a test tone generator 10 applies a test tone of the form $A\cos(wt)$ to a telephone line 8. The received signal is applied to the input of telephone line characteristic measuring instrument 20. The instrument derives five signals on conductors 22, 24, 32, 34 and 36.

The signal on conductor 36 is the test tone itself, $\cos(wt)$, and the signal on conductor 32 is $\sin(wt)$. These two signals are shown on respective conductors 38, 40 in FIG. 1 of my U.S. Pat. No. 3,814,868. The signal on conductor 34 is depicted as signal $V_4$ in my aforesaid patent; this is the "notched-noise" signal, the normalized received signal after the test tone has been subtracted from it.

The signals on conductors 24 and 22 represent respectively the instantaneous in-phase component of the total disturbance (in the 20–300 Hz band of interest) on the received test tone, and the instantaneous quadrature component of the total disturbance in the same passband on the received test tone.

FIG. 2 depicts the display apparatus disclosed in my aforesaid application. The two conductors 22 and 24 are applied to the inputs of respective amplifiers 30 and 40. Amplifier 30 is an inverting amplifier so that the minus sign in the expression for the phase modulation in the signal on conductor 22 is eliminated. (The fact that the second term in the expression for the signal on conductor 22 now has a minus sign in front of it is of no moment; the noise component is of a continuous random oscillating form in the first place.) After modulation, the two signals are applied to the horizontal and vertical deflection inputs of oscilloscope 50. The graticule 60 of the oscilloscope is shown in FIG. 3. The graticule markings, as well as how the amplifier gains should be adjusted, are described in my aforesaid application.

One of the problems in displaying a transient event is that part of the event may be over by the time it is determined that the event is happening. For this reason, the signals to be displayed (or, alternatively, the original signal from which these signals are derived) must be preserved until after the event of interest is actually detected. Toward this end, the two signals on conductors 22 and 24 of FIG. 2 are applied through respective delay lines 32 and 33 in FIG. 4, prior to their amplification and application to the deflection circuits of the oscilloscope. Each of the analog delay lines has a delay of 2 milliseconds.

The notched-noise signal on conductor 34 is applied to the input of threshold detector 66. Referring to FIG. 1, it will be noted that in the presence of any amplitude modulation, phase modulation, or noise, there is a non-zero notched-noise signal on conductor 34. Threshold detector 66 is a conventional circuit element for detecting a transient whose level exceeds a pre-set value; the threshold is preferably adjusted to be 10 percent of the normalized test tone level (representing a −20db signal-to-noise ratio), although any other suitable level may be selected. (Alternatively, it is possible to base the detection of a transient on the presence of a signal exceeding the threshold level on one of conductors 22 and 24, depending on whether amplitude or phase disturbances are of primary interest. It will also be apparent that other conditions may be imposed on the threshold detector if desired; for example, the transient may have to persist for two milliseconds before the transient is considered "valid".)

When threshold detector 66 detects a disturbance, its output triggers audible signal generator 70. This element simply audibly informs the operator that a disturbance has been detected and that the oscilloscope should be viewed. The output of the threshold detector also triggers gate generator 68. This gate applies a 22-millisecond unblanking signal to the Z-axis control of the oscilloscope. Thus the signals emerging from the two delay lines during the next 22 milliseconds control the formation of the display. Because of the 2-millisecond delay time of each delay line, the display is controlled by the 2-millisecond signal segment which was received prior to the detection of the disturbance and the 20-millisecond segment of the received test tone which follows the detection of the disturbance. The delay time of the two delay lines of FIG. 4 should be the same; otherwise, the time relationship between the orthogonal components will not be preserved.

After gate generator 68 turns off, the Z-axis of the oscilloscope is blanked so that the display on the oscilloscope remains unchanged. The oscilloscope 52 is of the storage type so that the display persists indefinitely. The display is erased only after erase button 62 is operated. The operation of button 62 also applies a ground signal over conductor 37 to the enable input of gate generator 68. In order for the gate generator to operate, it is not enough for its input from threshold detector 68 to be energized. It is also necessary that the gate generator first be enabled. The gate generator generates only a single 22-millisecond unblanking pulse for each operation of erase button 62. The first operation of the threshold detector which follows the erasing of the oscilloscope display results in the formation of a new display. Thereafter, the gate generator does not operate again, even though threshold detector 66 may operate, until after the display has been erased by the operation of erase button 62 and the gate generator has been enabled.

Although analog delay lines are utilized in the illustrative embodiments of the invention, it will be apparent that other types of delay lines may be incorporated in the systems. For example, charge-coupled devices and "bucket-brigade" delay lines may be utilized (in which case, if the devices are operated in a digital mode, it would be necessary to convert the analog signals to digital form at the inputs of the delay lines, and to convert the digital outputs to analog signals at the outputs of the delay lines). Similarly, instead of utilizing delay lines, the signals may be temporarily stored on a continuous magnetic tape loop. In general, any of many well-known types of delay mechanisms may be incorporated in the systems. It is also possible to record the various signals for display at some subsequent time. Rather than to form a display on an oscilloscope, it is even possible to trace out a display on a plotter. (When storing the signals for subsequent display on a plotter, digital delay lines are of particular advantage; typical plotters require slower signals, and digital delay devices permit a change in time scale by varying the clock rate.)

In the illustrative embodiment of the invention depicted in FIG. 5, a single delay line 42 is provided between telephone line 8 and telephone line characteristic measuring instrument 20, and threshold detector 66 is coupled to the telephone line. In this case, the threshold detector detects a disturbance on the received test tone, rather than a disturbance on the notched-noise signal. The function of the delay line is to delay the entire received signal prior to processing in order that a disturbance may be detected before it is too late to record it. Although the system of FIG. 5 requires the use of only one delay line rather than two, the delay line must be of a higher quality; it must pass the entire received signal without distortion, whereas delay lines 32 and 33 in the system of FIG. 4 must pass signals in only a relatively narrow passband.

In the system of FIG. 6, delay line 42 has applied to its input the notched-noise signal on conductor 34. The $\cos(wt)$ and $\sin(wt)$ signals on conductors 36 and 32 are applied to the inputs of respective multiplier and filter pairs 74, 76. Referring to my U.S. Pat. No. 3,814,868, the in-phase and quadrature components of the total disturbance on the received test tone are derived by multiplying the notched-noise signal by sine and cosine signals. In the system of FIG. 6, the in-phase and quadrature component disturbance signals are derived in the same way, but they are derived by operating on a delayed notched-noise signal. The function of delay line 42 is the same as the function of the delay line in the system of FIG. 5, although threshold detector 66 in FIG. 6 operates on the notched noise signal as opposed to the received test tone.

It is important, of course, in accordance with the theory set forth in my U.S. Pat. No. 3,814,868 that the $\cos(wt)$ and $\sin(wt)$ signals which are used in the multiplication processes be in phase and in quadrature with the notched-noise signal. By introducing delay line 42 into the system of FIG. 6, the coherence between the various signals might be destroyed if the delay of the delay line is not carefully controlled. The delay should be an integral number of cycles (or half cycles) of the frequency $w$; in such a case, as far as the multipliers are concerned, the delayed notched-noise signal has the same phase relationship to the sine and cosine signals as in the other embodiments of the invention.

Although the invention has been described with reference to particular embodiments of the invention, it is to be understood that these embodiments are merely illustrative of the application of the principles of the invention. Numerous modifications may be made therein and other arrangements may be devised without departing from the spirit and scope of the invention.

What I claim is:

1. A display system for use with a transmission path characteristic measuring instrument, said instrument having means for processing a received signal having test tone and disturbance components therein to derive a first signal substantially representative of the instantaneous in-phase component of the total disturbance of interest on the received test tone and a second signal substantially representative of the instantaneous quadrature component of the total disturbance of interest on the received test tone, comprising storage display means having first and second orthogonal input circuits responsive to the application of signals thereto for selectively generating and storing a display, means for detecting a disturbance on said received signal and in response thereto for controlling said storage display means to generate and store a new display, and means for coupling each of said first and second signals to a respective one of said first and second orthogonal input circuits at a time delayed relative to said received signal to allow a new display to be generated at least in part in accordance with the disturbance on the received signal which was detected by said detecting means.

2. A display system in accordance with claim 1 wherein said processing means is operative to eliminate substantially all of the test tone from each of said first and second signals, said first signal includes two components, one representing the amplitude modulation of the received test tone and the other representing the instantaneous in-phase component of noise on the received test tone, and said second signal includes two components, one representing the phase modulation of the received test tone and the other representing the instantaneous quadrature component of noise on the received test tone.

3. A display system in accordance with claim 1 wherein each of said first and second signals includes two components, the first component in each of said signals representing a respective one of the amplitude modulation and the phase modulation of the received test tone, and the second component in each of said signals representing a respective one of the instantaneous in-phase and quadrature components of noise on the received test tone.

4. A display system in accordance with claim 3 wherein said storage display means is a storage oscilloscope.

5. A display system in accordance with claim 4 wherein said storage oscilloscope includes manually operative means for erasing a display and enabling the generation and storage of a new display responsive to the next operation of said detecting means.

6. A display system in accordance with claim 5 wherein responsive to the operation of said detecting means said first and second signals control the generation of a new display during a following predetermined time interval.

7. A display system in accordance with claim 1 wherein said storage display means is a storage oscilloscope.

8. A display system in accordance with claim 7 wherein said storage oscilloscope includes manually operative means for erasing a display and enabling the generation and storage of a new display responsive to the next operation of said detecting means.

9. A display system in accordance with claim 1 wherein responsive to the operation of said detecting means said first and second signals control the generation of a new display during a following predetermined time interval.

10. An information storage system for use with a transmission path characteristic measuring instrument, said instrument having means for processing a received signal having test tone and disturbance components therein to derive a first signal substantially representative of the instantaneous in-phase component of the total disturbance of interest on the received test tone and a second signal substantially representative of the instantaneous quadrature component of the total disturbance on the received test tone, comprising means having first and second input circuits responsive to the application of signals thereto for selectively storing information, means for detecting a disturbance on said received signal and in response thereto for controlling said storing means to store new information, and means for coupling each of said first and second signals to a respective one of said first and second input circuits at a time delayed relative to said received signal to allow new information to be stored at least in part in accordance with the disturbance on the received signal which was detected by said detecting means.

11. An information storage system in accordance with claim 10 wherein said processing means is operative to eliminate substantially all of the test tone from each of said first and second signals, said first signal includes two components, one representing the amplitude modulation of the received test tone and the other representing the instantaneous in-phase component of noise on the received test tone, and said second signal includes two components, one representing the phase modulation of the received test tone and the other representing the instantaneous quadrature component of noise on the received test tone.

12. An information storage system in accordance with claim 10 wherein each of said first and second signals includes two components, the first component in each of said signals representing a respective one of the amplitude modulation and the phase modulation of the received test tone, and the second component in each of said signals representing a respective one of the instantaneous in-phase and quadrature components of noise on the received test tone.

13. An information storage system in accordance with claim 12 wherein responsive to the operation of said detecting means said storing means stores information during a following predetermined time interval.

14. An information storage system in accordance with claim 13 wherein said display means is a storage oscilloscope having a graticule on the face thereof with orthogonal axes calibrated to represent phase jitter and amplitude modulation, said oscilloscope being calibrated so that a display formed thereby permits quantitative values of amplitude modulation and phase jitter to be read from said graticule, said graticule further exhibiting circles calibrated to represent disturbance levels.

15. An information storage system in accordance with claim 14 wherein said processing means derives said first and second signals scaled relative to said graticule.

16. An information storage system in accordance with claim 10 wherein responsive to the operation of said detecting means said storing means stores information during a following predetermined time interval.

17. An information storage system in accordance with claim 16 wherein said display means is a storage oscilloscope having a graticule on the face thereof with orthogonal axes calibrated to represent phase jitter and amplitude modulation, said oscilloscope being calibrated so that a display formed thereby permits quantitative values of amplitude modulation and phase jitter to be read from said graticule, said graticule further exhibiting circles calibrated to represent disturbance levels.

18. An information storage system in accordance with claim 17 wherein said processing means derives said first and second signals scaled relative to said graticule.

19. An information storage system in accordance with claim 10 wherein said display means is a storage oscilloscope having a graticule on the face thereof with orthogonal axes calibrated to represent phase jitter and amplitude modulation, said oscilloscope being calibrated so that a display formed thereby permits quantitative values of amplitude modulation and phase jitter to be read from said graticule, said graticule further exhibiting circles calibrated to represent disturbance levels.

20. An information storage system in accordance with claim 19 wherein said processing means derives said first and second signals scaled relative to said graticule.

* * * * *